US012607797B2

(12) United States Patent
Li

(10) Patent No.: US 12,607,797 B2
(45) Date of Patent: Apr. 21, 2026

(54) MULTICORE OPTICAL FIBER WITH LOW GROUP DELAY

(71) Applicant: CORNING INCORPORATED, Corning, NY (US)

(72) Inventor: Ming-Jun Li, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 244 days.

(21) Appl. No.: 18/353,984

(22) Filed: Jul. 18, 2023

(65) Prior Publication Data

US 2024/0053530 A1    Feb. 15, 2024

Related U.S. Application Data

(60) Provisional application No. 63/396,396, filed on Aug. 9, 2022.

(51) Int. Cl.
G02B 6/02        (2006.01)
G02B 6/036       (2006.01)

(52) U.S. Cl.
CPC ....... G02B 6/02042 (2013.01); G02B 6/0365 (2013.01)

(58) Field of Classification Search
CPC .......................... G02B 6/02042; G02B 6/0365
See application file for complete search history.

(56) References Cited

U.S. PATENT DOCUMENTS

| | | | |
|---|---|---|---|
| 8,811,787 B2 | 8/2014 | Feuer | |
| 10,073,217 B2 | 9/2018 | Ishida et al. | |
| 2013/0136404 A1* | 5/2013 | Feuer | H04J 14/052 |
| | | | 385/124 |
| 2013/0251320 A1* | 9/2013 | Hayashi | G02B 6/4401 |
| | | | 385/100 |
| 2015/0316715 A1* | 11/2015 | Matsuo | G02B 6/0365 |
| | | | 385/124 |
| 2017/0160466 A1* | 6/2017 | Imamura | G02B 6/0288 |
| 2018/0356590 A1* | 12/2018 | Amma | G02B 6/036 |

OTHER PUBLICATIONS

Jeunhomme, "Single Mode Fiber Optics", Marcel Dekker, New York, 1990, pp. 39-44.

* cited by examiner

*Primary Examiner* — Uyen Chau N Le
*Assistant Examiner* — Darby M. Thomason
(74) *Attorney, Agent, or Firm* — Yiqun Zhao

(57)    ABSTRACT

A multicore optical fiber is provided including a first core region having a first refractive index profile, a second core region having a second refractive index profile, wherein the first core region is separated from the second core region by a separation distance in a range of 20-50 μm, and an outer cladding surrounding the first and second core regions, wherein the first core region exhibits a first effective index and a first group index and the second core region exhibits a second effective index and a second group index, and the first and second effective indices are substantially different to suppress crosstalk and the first and second group indices are substantially the same to achieve a substantially similar group velocity.

18 Claims, 2 Drawing Sheets

MULTICORE OPTICAL FIBER WITH LOW GROUP DELAY

CROSS-REFERENCE TO RELATED APPLICATIONS

This application claims the benefit of priority of U.S. Provisional Application Ser. No. 63/396,396 filed on Aug. 9, 2022, the content of which is relied upon and incorporated herein by reference in its entirety.

BACKGROUND OF THE DISCLOSURE

The present disclosure generally relates to multicore optical fiber that typically includes a common cladding and a plurality of core regions having cores which are particularly well-suited for increased capacity, long range networks and data center networks. Multicore optical fibers provide enhanced signal carrying capacity and increased fiber density. The spacing between the cores is generally limited by crosstalk. One approach to reduce the crosstalk is to use heterogeneous core designs which have different refractive profile designs such that the cores may have different effective indices which may introduce phase mismatch in optical fields between the cores. While crosstalk may be reduced, the cores may have different group velocities which may cause time delays or skews for transmission. It would be desirable to provide for a multicore optical fiber having multiple core regions with reduced crosstalk and reduced time delays or skews for transmission.

SUMMARY OF THE DISCLOSURE

In accordance with one embodiment, a multicore optical fiber is provided. The multicore optical fiber includes a first core region having a first refractive index profile, and a second core region having a second refractive index profile, wherein the first core region is separated from the second core region by a separation distance in a range of 20-50 µm. The multicore optical fiber also includes an outer cladding surrounding the first and second core regions, wherein the first core region exhibits a first effective index and a first group index and the second core region exhibits a second effective index and a second group index, wherein the first and second effective indices are substantially different to suppress crosstalk and the first and second group indices are substantially the same to achieve a substantially similar group velocity.

In accordance with another embodiment, a multicore optical fiber is provided. The multicore optical fiber includes a first core region having a first refractive index profile and a first core having a first core size, and a second core region having a second refractive index profile and a second core having a second core size different from the first core size, wherein the first core region is separated from the second core region by a separation distance in a range of 20-50 µm. The multicore optical fiber also includes an outer cladding surrounding the first and second core regions, wherein the first core region exhibits a first effective index and a first group index and the second core region exhibits a second effective index and a second group index, wherein the first and second effective indices are substantially different to suppress crosstalk and the first and second group indices are substantially the same to achieve a substantially similar group velocity, wherein the first and second effective indices are greater than $1\times10^{-5}$ and the first and second group indices of the first and second core regions are within $1\times10^{-3}$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
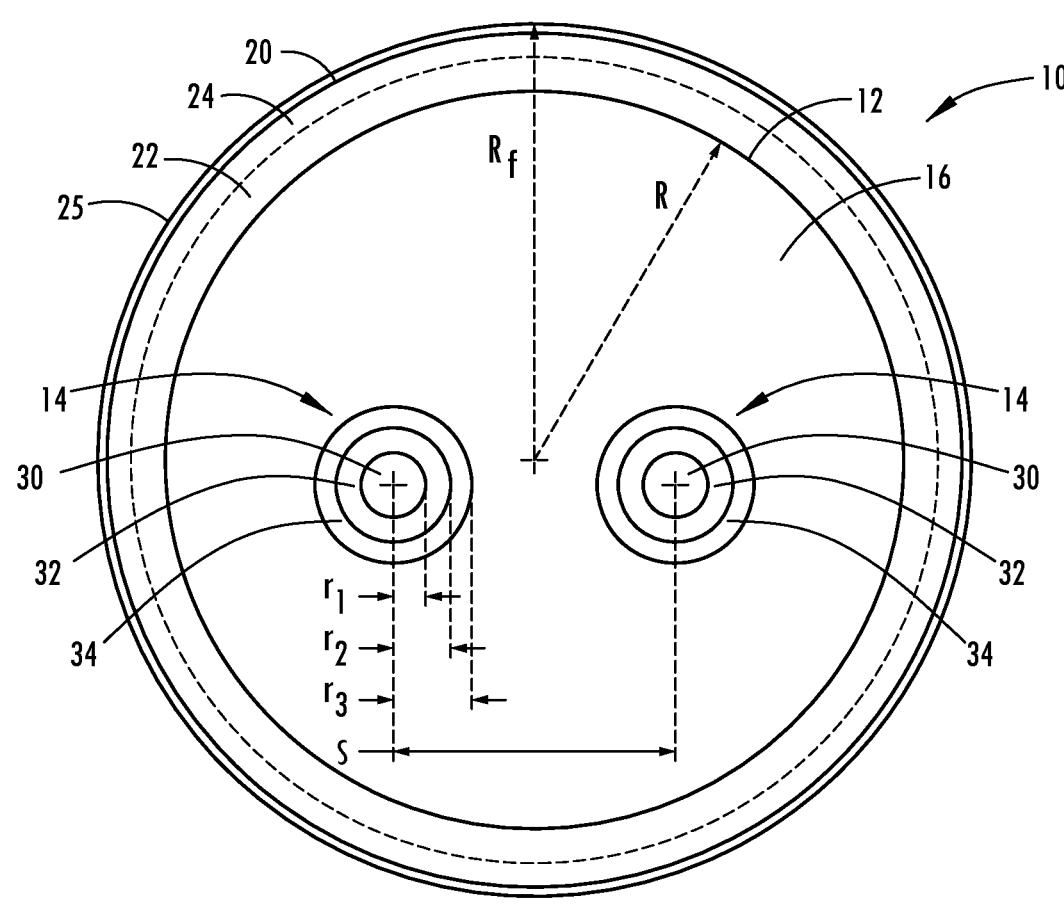
FIG. 1 is an end view of a multicore optical fiber having two core regions, according to one example.

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

"Refractive index" refers to the refractive index at a wavelength of 1550 nm.

The "refractive index profile" is the relationship between refractive index or relative refractive index and waveguide fiber radius. The radius for each region of the refractive index profile is given by the abbreviations $r_1$, $r_2$, $r_3$, $r_4$, etc. and lower and upper case are used interchangeably herein (e.g., $r_1$ is equivalent to $R_1$).

The "relative refractive index percent" is defined as $\Delta\% = 100\times(n_i^2 - n_c^2)/2n_i^2$, and as used herein $n_i$ is the refractive index of region i of the optical fiber and $n_c$ is the refractive index of undoped silica. As used herein, the relative refractive index is represented by $\Delta$ and its values are given in units of "%", unless otherwise specified. The terms: delta, $\Delta$, $\Delta\%$, $\%\Delta$, delta %, % delta and percent delta may be used interchangeably herein. In cases where the refractive index of a region is less than the average refractive index of undoped silica, the relative refractive index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine (F) and boron (B).

"Chromatic dispersion," herein referred to as "dispersion" unless otherwise noted, of a waveguide fiber is the sum of the material dispersion, the waveguide dispersion, and the inter-modal dispersion. In the case of single mode waveguide fibers, the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = \frac{2\pi \left[ \int_0^\infty (f(r))^2 r dr \right]^2}{\int_0^\infty (f(r))^4 r dr}$$

where f(r) is the transverse component of the electric field associated with light propagated in the waveguide. As used herein, "effective area" or "$A_{eff}$" refers to optical effective area at a wavelength of 1550 nm unless otherwise noted.

The "effective index" $n_{eff}$ of an optical fiber is the ratio of the propagation constant $\beta$ of a guided mode with wavelength $\lambda$ in the optical fiber to the propagation constant $\beta_0$ of light with wavelength $\lambda$ in vacuum:

$$n_{eff} = \frac{\beta}{\beta_0}$$

where $$\beta_0 = \frac{2\pi}{\lambda}$$

The propagation constant $\beta$ corresponds to the change in phase of the guided mode per unit length in the fiber and $\beta_0$ corresponds to the change in phase per unit length of the light in vacuum. The effective index is reported herein at a wavelength of 1550 nm, a wavelength at which the optical fibers described herein are single-mode fibers.

The effective index is related to the phase velocity of a guided mode in an optical fiber. When two cores have the same effective index, they have the same phase velocity and the two cores are at the phase-matched condition. At the phase-matched condition, crosstalk between the cores is maximized because phase matching of the light coupled from one core to the other core leads to constructive interference of the optical signals in the two cores during coupling. If the two cores differ in effective index, destructive interference of the optical signals in the two cores occurs during coupling and crosstalk is reduced. The reduction in crosstalk increases as the difference between the effective indices of the two cores increases. Accordingly, as disclosed herein, it is preferable to maintain a large difference between the effective indices of two different cores to reduce signal crosstalk.

Reference to a difference between a first quantity and a second quantity means the result obtained by subtracting the second quantity from the first quantity. For example, a difference between a first effective index and a second effective index means the result obtained by subtracting the second effective index from the first effective index and a difference between a radius $r_i$ and a radius $r_j$ refers to $r_i - r_j$. Reference to a magnitude of a quantity or a magnitude of a difference refers to the absolute value of the quantity or the difference. The trench volume $V_3$ is defined for a depressed index region $$V_3 = \left| 2 \int_{r_{Trench,inner}}^{r_{Trench,outer}} (\Delta_{Trench}(r) - \Delta_c) r dr \right|$$

where $r_{Trench,inner}$ is the inner radius of the trench cladding region, $r_{Trench,outer}$ is the outer radius of the trench cladding region, $\Delta_{Trench}(r)$ is the relative refractive index of the trench cladding region, and $\Delta_c$ is the average relative refractive index of the common outer cladding region of the glass fiber. In embodiments in which a trench is directly adjacent to the core, $r_{Trench,inner}$ is $r_2 = r_1$ (outer radius of the core), $r_{Trench,outer}$ is $r_3$, and $\Delta_{Trench}$ is $\Delta_3(r)$. In embodiments in which a trench is directly adjacent to an inner cladding region, $r_{Trench,inner}$ is $r_2 > r_1$, $r_{Trench,outer}$ is $r_3$, and $\Delta_{Trench}$ is $\Delta_3(r)$. Trench volume is defined as an absolute value and has a positive value. Trench volume is expressed herein in units of % $\Delta$-micron$^2$, % $\Delta$-$\mu$m$^2$, or %-micron$^2$, %-$\mu$m$^2$, whereby these units can be used interchangeably.

The term "$\alpha$-profile" refers to a relative refractive index profile, expressed in terms of $\Delta(r)$ which is in units of "%", where r is radius, which follows the equation, $$\Delta(r) = \Delta(r_0) \left[ 1 - \left[ \frac{|r - r_0|}{(r_1 - r_0)} \right]^\alpha \right]$$

where $r_o$ is the point at which $\Delta((r)$ is maximum, $r_1$ is the point at which $\Delta(r)$ % is zero, and r is in the range $r_i \leq r \leq r_f$, where $\Delta$ is defined above, $r_i$ is the initial point of the $\alpha$-profile, $r_f$ is the final point of the $\alpha$-profile, and a is an exponent which is a real number. The mode field diameter (MFD) is measured using the Peterman II method wherein, $$MFD = 2w$$

$$w^2 = 2 \frac{\int_0^\infty (f(r))^2 r dr}{\int_0^\infty \left( \frac{df(r)}{dr} \right)^2 r dr}$$

Mode field diameter depends on the wavelength of the optical signal in the optical fiber. Specific indication of the wavelength will be made when referring to mode field diameter herein. Unless otherwise specified, mode field diameter refers to the $LP_{01}$ mode at the specified wavelength.

The theoretical fiber cutoff wavelength, or "theoretical fiber cutoff," or "theoretical cutoff," for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m (2 meter) fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m (22 meter) cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

The term "mode" refers to guided mode. A single-mode fiber is an optical fiber designed to support only the fundamental $LP^{01}$ modes over a substantial length of the optical fiber (e.g., at least several meters), but that under certain circumstances can support multiple modes over short distances (e.g., tens of centimeters). We assume that the birefringence of the fiber is sufficiently low to assume that the two orthogonally polarized components of the $LP_{01}$ mode are degenerate and propagate with the same phase velocity. A multimode optical fiber is an optical fiber designed to support the fundamental $LP_{01}$ mode and at least one higher-order $LP_{nm}$ mode over a substantial length of the optical fiber, where either $n \neq 0$ or $n \neq 1$.

Unless otherwise noted herein, optical properties (such as dispersion, dispersion slope, etc.) are reported for the $LP_{01}$ mode.

The group velocity $v_g$ of a pulsed optical signal may be represented by:

$$v_g = \frac{d\beta}{d\omega} = \frac{C}{n_g},$$

where $\omega$ is the angular frequency and $\beta$ is the propagation constant, c is the light velocity in vacuum, and $n_g$ is the group index. The group delay $\tau$ is given by $$\tau = \frac{L}{v_g} = \frac{L}{C} n_g,$$

where L is the distance travelled by the optical signal in a fiber in the direction of propagation from the point of launch to the point of detection. For purposes of the present disclosure, group velocity and group delay are reported for a wavelength of 1310 nm and a wavelength of 1550 nm.

"Group index" identified as $n_g$ refers to the ratio the speed of light c in a vacuum to the group velocity $v_g$.

Referring to FIG. 1, the terminal end of multicore optical fibers 10 having an inner glass region 12 containing a plurality of core regions 14 surrounded by a common outer cladding 16 and an outer coating layer 20 are illustrated, according to one example. The plurality of core regions 14 each define a core-portion of inner glass region 12 and may be glass core regions each having a circular shape in cross-section and spaced apart from one another. Each core region 14 includes a core 30, an inner cladding 32 surrounding the core 30, and a trench 34 surrounding the inner cladding 32. The trench 34 may be offset from the core 30 and may allow for a large trench volume. In some embodiments, the inner cladding 32 may be omitted such that the trench 34 is adjacent to the core 30.

The common outer cladding 16 is shown having a generally circular end shape or cross-sectional shape in the embodiments illustrated. The plurality of core regions 14 each extend in a cylindrical shape through the length of the multicore optical fiber 10 and are illustrated spaced apart from one another and are surrounded and separated by the common outer cladding 16. The multicore optical fiber 10 includes at least two core regions 14. In the example shown, the multicore optical fiber 10 contains two core regions; however, it should be appreciated that the multicore optical fiber 10 may include more than two core regions, such as for example four core regions, seven core regions, eight core regions, twelve core regions, sixteen core regions, or nineteen core regions, and therefore has a plurality of core regions 14. It should be appreciated that two or more core regions 14 may be included in the multicore optical fiber 10 in various numbers of core regions and various geometric arrangements.

The multicore optical fiber 10 employs a plurality of core regions 14 spaced from one another and surrounded by the common outer cladding 16. The core regions 14 and common outer cladding 16 may be made of glass or other optical fiber material and may be doped suitable for optical fiber. In one embodiment, each core region 14 is comprised of germania-doped silica core, an inner pure silica cladding and a fluorine-doped silica trench. The core regions 14 may exhibit similar or different relative refractive indices Ai and may have different size core radiuses and/or effective areas resulting in different refractive index profiles which results in heterogeneous cores. In one embodiment, the end view shape of the multicore optical fiber 10 may be a circular end shape or circular cross-sectional shape as shown in FIG. 1. According to other embodiments, other end and cross-sectional shapes and sizes may be employed including elliptical, hexagonal and various polygonal forms. The multicore optical fiber 10 includes a plurality of core regions 14, each capable of communicating light signals between transceivers including transmitters and receivers which may allow for parallel processing of multiple signals. The multicore optical fiber 10 may be used for wavelength division multiplexing (WDM) or multi-level logic or for other parallel optics of spatial division multiplexing. The multicore optical fiber 10 may advantageously be aligned with and connected to various devices in a manner that allows for easy and reliable connection so that the plurality of core regions 14 are aligned accurately at opposite terminal ends with like communication paths in connecting devices.

The multicore optical fiber 10 illustrated in FIG. 1 has an inner glass region 12 having two (2) circular-shaped core regions 14 arranged in a 1×2 array and surrounded by a common outer cladding 16. Each of the circular-shaped core regions 14 has an outer radius $r_3$ greater than 11 microns, according to one example. The outer radius $r_3$ may be greater than 13 microns, according to another example. The outer radius $r_3$ of each core region 14 is measured with respect to its center as shown in FIG. 1. The outer radius $r_3$ may have an upper limit of 20 microns, for example. Each core region 14 has a central core 30 surrounded by an inner cladding 32 which is surrounded by a trench 34. Each core 30 has an outer radius $r_1$ which may be in the range of 3 to 6 μm, and more preferably in the range of 4 to 5 μm. The core 30 of each core region 14 may be different in size such as radius $r_1$ from the core 30 of other core regions to achieve different refractive index profiles for the multiple core regions 14. For example, the radius $r_1$ of one core 30 may be 4.52 μm, and the radius $r_1$ of another core 30 may be 4.16 μm. The inner cladding 32 has an outer radius $r_2$ and may have a thickness of $r_2 - r_1$ in the range of 0 to 5 μm. The trench has an outer radius $r_3$ with a thickness in the range of 1 to 6 μm, and more preferably in the range of 3 to 5 μm.

Adjacent core regions 14 are spaced apart from each other by a separation distance S, which is defined as a distance between the centers of adjacent core regions 14. Separation distance S between centers of adjacent core regions 14 is sufficiently large to ensure low crosstalk between the multiple core regions 14, and may be greater than 20 microns, such as in the range between 20 and 50 μm, according to one example, and in the range between 25 and 45 μm, according to another example.

The common outer cladding 16 is shown having an outer circular shape defining the shape of the inner glass region 12 with a glass radius R. In one embodiment, the glass radius R may be between 60 microns and 130 microns.

In the embodiment shown in FIG. 1, the multicore optical fiber 10 has an inner glass region 12 having the two core regions 14 arranged in a 1×2 array and centered within and about the center of inner glass region 12. As such, the core regions 14 are spaced apart and centered within the inner glass region 12 such that they are symmetric about and evenly spaced from a center of inner glass region 12. It should be appreciated that one or more markers may be employed to assist with identifying the alignment of the core regions 14. A marker may be employed to determine the alignment of the core regions 14 for interconnection with other fibers or connection devices and may be made of a fluorine-doped glass having a refractive index that is lower than that of silica.

The multicore optical fiber 10 includes an outer coating layer 20 which surrounds and encapsulates the inner glass region 12. The outer coating layer 20 is shown in FIG. 1, according to one example having a primary or inner coating layer 22 that immediately surrounds the inner glass region 12 and a secondary or outer coating layer 24 that immediately surrounds the primary coating layer 22. The coating layer 20 may further include a tertiary layer 25 (e.g., ink layer) optionally surrounding or directly adjacent to the secondary coating layer 24.

The coating layer 20 may have a ratio of the thickness of the secondary coating layer 24 to the thickness of the primary coating layer in the range of, for example, 0.65 to 1.0, according to one embodiment. This advantageously may aid in a desirable goal in reducing signal crosstalk between core regions 14 in the multicore optical fiber 10 and leakage of signals from the fiber cores to the outside of multicore optical fiber 10. The primary coating layer 22 may be made of a known primary coating composition such as acylate based polymer with a Young's modulus of 10 MPa or less. The secondary coating layer may be made of a known composition such as acylate based polymer with a Young's modulus of 700 MPa or greater.

The inner glass region 12 may have an overall cross-sectional radius R, which may be in the range of 60 to 130 microns, according to one example. The outer coating layer 20 may have a thickness in the range or 22 to 65 microns, the primary coating layer 22 may have a thickness in the range of 12 to 35 microns. The secondary coating layer 24 may have a thickness in the range or 10 to 30 microns. The optional tertiary coating layer 25 may have a thickness equal to or less than 10 microns. The coated multicore optical fiber 10 may have an overall fiber radius $R_f$ equal to or less than 200 microns.

Each core region 14 may be formed of germania-doped silica or other suitable glass and may have a fluorine-based silica trench, wherein the trench volume of the fluorine-doped silica trench is greater than 50% Δ microns². The common outer cladding 16 may be made of silica or fluorine-doped silica or other suitable glass. It should be appreciated that the inner glass region 12 may be formed from a preform drawn at an elevated temperature (e.g., temperature of about 2,000° C.) in a furnace. The outer coating layer 20, including one or more of the primary coating layer 22, secondary coating layer 24 and tertiary coating layer 25, may be applied after the uncoated optical fiber exits the furnace and is cooled.

Each core region is designed to have a different refractive index profile. In the two core embodiments, the first core region has a first refractive index profile and the second core region has a second refractive index profile. In embodiments with more than two cores, the cores are arranged by alternating the first and second cores regions such that the first core region is next to the second core region.

The multicore optical fiber 10 achieves crosstalk less than −30 dB/km, more preferably −50 dB/km, and even more preferably below −60 dB/km. The core regions 14 are designed to have different refractive index profiles so that the first and second effective indices are substantially different to suppress crosstalk. Preferably, the effective index difference between the multiple cores is more than $1 \times 10^{-5}$, more preferably more than $1 \times 10^{-4}$. Additionally, the core profile parameters may be chosen so that the group indices of the multiple core regions 14 are substantially the same to result in the same group velocity. The group index difference between the multiple cores is preferably less than $1 \times 10^{-3}$, more preferably less than $1 \times 10^{-4}$ such that the group indexes are substantially the same and achieve a substantially similar group velocity.

Figure 2:
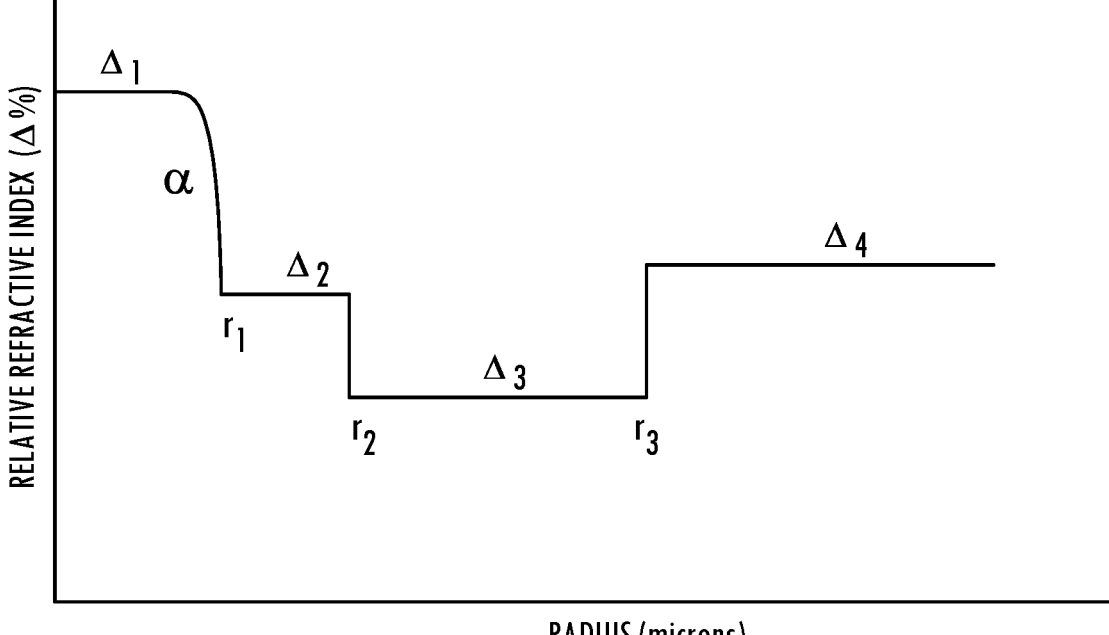
FIG. 2 is a graph illustrating the refractive index design profile of each of the core regions of the multicore optical fiber as shown in FIG. 1.

The core regions 14 can exhibit an α-profile as shown in the example of FIG. 2. A low index trench 34 can be formed after the inner cladding 32 to increase light confinement in the core region 14. The maximum index of the core $\Delta_1$ is greater than the outer cladding index $\Delta_4$. The relative refractive index $\Delta_1$ of the core region 14 to the inner cladding is in the range between 0.2% and 0.5%, and more preferably in the range of 0.25% and 0.4%. The core radius $r_1$ may be selected in the range of 3 to 10 micrometers so that the core 30 is single mode at an operating wavelength such as, for example, 1310 nm, or 1550 nm. The low index trench has a relative refractive index $\Delta_3$ n the range of about −0.7% to −0.1%, and a width $W = r_3 - r_2$ in the range of 1 to 6 micrometers, according to one example. The trench can be offset by a distance $D = r_1 - r_2$ from the core. The offset D may be, for example, in the range between 0 to 5 micrometers. The inner cladding relative refractive index $\Delta_2$ and the outer cladding relative refractive index $\Delta_4$ may be substantially the same or different. The fiber diameter, which is twice the radius $2 \times R_f$, is preferably less than 250 micrometers, more preferably less than 150 micrometers, and in one specific example, about 125 micrometers.

As used herein, crosstalk refers to transfer of optical signal intensity from one core to another core. Crosstalk is facilitated by overlap of the evanescent field of an optical signal in one core with a cladding region or core region of another core. Crosstalk is also facilitated by overlap of the evanescent field of an optical signal in one core with the evanescent field of an optical signal in another core in a cladding region between the two cores.

For the multicore fiber that is deployed in a substantially straight condition, the crosstalk between two neighboring cores may be represented by the following equation:

$$X = \left(\frac{\kappa}{g}\right)^2 \frac{L}{L_c} \langle \sin^2(g\Delta L)\rangle$$

where κ is the coupling coefficient, L is the fiber length, ΔL is fiber correlation length distribution with average of Lc, g is related to the coupling coefficient κ and the phase mismatch Δβ between the two cores, and wherein $$g^2 = \kappa^2 + \left(\frac{\Delta\beta}{2}\right)^2$$

The propagation constant is related to the effective index of a guided mode:

$$\beta = \frac{2\pi}{\lambda} n_{eff}$$

For multicore fibers, when the multiple cores have the same effective index, the cores have the same propagation constant and the cores are at the phase match condition. The above equations show that, when the phase match condition is satisfied Δβ=0, the crosstalk is maximal because the light coupled from one core to another core is in phase, resulting in constructive interference. If the two cores have different effective indices, the crosstalk is reduced because the light coupled from one core to another core is not in phase resulting in destructive interference.

Figure 3:
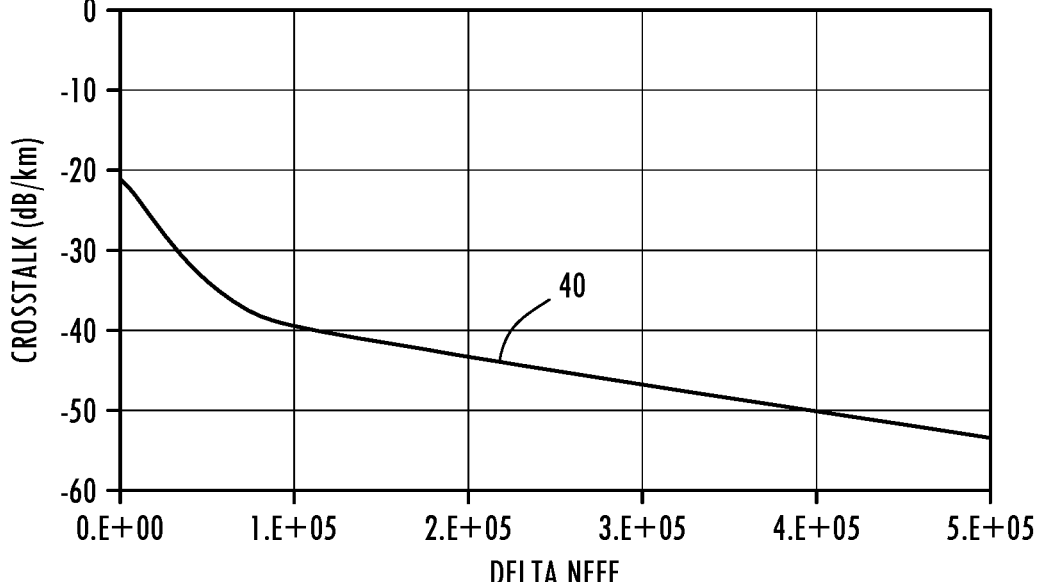
FIG. 3 is a graph illustrating crosstalk as a function of effective index difference between the two cores.

FIG. 3 shows an example of modeled crosstalk 40 as a function of the difference in effective index between two cores assuming the coupling coefficient k=0.0005116 l/m. When the two cores are at the phase matching condition, the modeled crosstalk 40 may be about −21 dB/km. For an effective index difference of 5×10⁻⁶, the modeled crosstalk 40 may drop by about 12 dB/km, or the modeled crosstalk 40 is −33 dB/km. When the effective index difference is greater than 1×10⁻⁵, the modeled crosstalk 40 may be reduced by more than about 20 dB/km, or the modeled crosstalk 40 is −41 dB/km. When the effective index difference is greater than 5×10⁻⁵, the modeled crosstalk 40 may be reduced by more than about 30 dB/km, or the modeled crosstalk 40 is −51 dB/km. Therefore, for multicore fibers, it is desirable to increase the phase mismatch to reduce the level of crosstalk. However, one issue for multiple cores with different effective indices is that the cores tend to have different group velocities, which may cause group delay difference or skews for transmission. The skew is not desirable for high speed transmission systems as it can cause the signals to be out of sync, which may increase the complexity of signal switching and processing.

The equation for group delay τ shows that the group delay τ depends on the group index $n_g$. To minimize the skew between multiple cores, the difference between the group indices $n_g$ of the multiple cores may be reduced.

In accordance with another embodiment, the multicore optical fiber includes a first core region having a first refractive index profile, a second core region having a second refractive index profile, wherein the first core region is separated from the second core region by a separation distance in a range of 20-50 μm, and an outer cladding surrounding the first and second core regions, wherein the first core region exhibits a first effective index and a first group index, and the second core region exhibits a second effective index and a second group index, wherein the first and the second effective indices are substantially different to suppress the crosstalk between the cores and the first and second group indices are substantially the same to achieve a substantially similar group velocity, wherein the crosstalk between the cores is less than −30 dB/km, and the differential group delay between the cores is less than 1 ps/km.

The multicore fiber 10 is designed with cores with different effective indices but with the same group index to achieve reduced crosstalk and low skew by choosing profile parameters as shown in FIG. 2. Table 1 below shows three design examples labelled examples 1-3 of the two core fibers 10 for the operating wavelength of 1310 nm, and Table 2 below further shows three design examples labelled examples 4-6 for the operating wavelength of 1550 nm. These examples 1-6 show that the two cores have an effective index difference of greater than 10⁻⁴ and a delta beta greater than 500 l/m, which is effective in reducing the crosstalk between the multiple cores. On the other hand, the two cores have a group index $n_g$ difference of less than 10⁻⁴, which corresponds to a group delay difference Delta τ of less than 0.5 ps/km. When the group index $n_g$ difference of less than 5×10⁻⁵, a group delay difference Delta τ is less than 0.1 ps/km is achieved.

TABLE 1

| | Design examples for 1310 nm wavelength | | | | | |
| | Example 1 | | Example 2 | | Example 3 | |
| | Core A | Core B | Core A | Core B | Core A | Core B |
|---|---|---|---|---|---|---|
| Core delta $\Delta_1$ (%) | 0.34 | 0.35 | 0.34 | 0.34 | 0.34 | 0.34 |
| Core radius $r_1$ (μm) | 4.52 | 4.16 | 4.42 | 4.32 | 3.90 | 4.08 |
| alpha | 20 | 20 | 20 | 20 | 20 | 20 |
| Inner clad delta $\Delta_2$ (%) | na | na | na | −0.05 | 0.00 | 0.00 |
| Inner clad radius $r_2$ (μm) | na | na | na | 8.64 | 8.58 | 8.98 |
| Trench delta $\Delta_3$ (%) | na | na | na | na | −0.50 | −0.50 |
| Trench radius $r_3$ (μm) | na | na | na | na | 14.50 | 14.00 |
| Cable Cutoff (μm) | 1241 | 1152 | 1220 | 1190 | 1194 | 1217 |
| MFD (μm) | 9.2 | 8.8 | 9.1 | 8.7 | 8.4 | 8.5 |
| Effective Area (μm²) | 66.7 | 61.1 | 64.9 | 60.0 | 55.2 | 56.8 |
| Dispersion (ps/nm.km) | 0.44 | −0.71 | 0.19 | 0.26 | 0.20 | 0.52 |

TABLE 1-continued

| | Example 1 | | Example 2 | | Example 3 | |
|---|---|---|---|---|---|---|
| | Core A | Core B | Core A | Core B | Core A | Core B |
| Slope (ps/nm$^2$.km) | 0.0863 | 0.0849 | 0.0859 | 0.0840 | 0.0920 | 0.0914 |
| Lambda 0 (nm) | 1305 | 1318 | 1.308 | 1.307 | 1312 | 1316 |
| Pin Array (dB) | 0.43 | 0.70 | 0.44 | 0.96 | 2.50 | 1.64 |
| Lateral Load (dB) | 0.070 | 0.060 | 0.065 | 0.050 | 0.048 | 0.052 |
| Group Index $n_g$ | 1.467253 | 1.467344 | 1.467323 | 1.467353 | 1.467193 | 1.467233 |
| Effective Index | 1.449475 | 1.449345 | 1.449471 | 1.449244 | 1.449013 | 1.449158 |
| Delta $n_g$ | 0.000091 | | 0.000031 | | 0.000040 | |
| Delta $n_{eff}$ | 0.000129 | | 0.000227 | | 0.000144 | |
| Group delay difference Delta $\tau$ (ps/km) | 0.30 | | 0.10 | | 0.13 | |
| Delta beta (1/m) | 621 | | 1089 | | 692 | |

TABLE 2

Design examples for 1550 nm wavelength

| | Example 4 | | Example 5 | | Example 6 | |
|---|---|---|---|---|---|---|
| | Core A | Core B | Core A | Core B | Core A | Core B |
| Core delta $\Delta_1$ (%) | 0.34 | 0.34 | 0.345 | 0.34 | 0.34 | 0.34 |
| Core radius $r_1$ ($\mu$m) | 5.1 | 5.3 | 4.9 | 5.3 | 4.2 | 4.4 |
| alpha | 20.0 | 20.0 | 20.0 | 20.0 | 20.0 | 20.0 |
| Inner clad delta $\Delta_2$ (%) | na | na | −0.1 | −0.05 | 0.00 | 0.00 |
| inner clad radius $r_2$ ($\mu$m) | na | na | 9.8 | 10.6 | 9.24 | 9.68 |
| Trench delta $\Delta_3$ (%) | na | na | na | na | −0.50 | −0.50 |
| Trench radius $r_3$ (um) | na | na | na | na | 15.00 | 15.00 |
| Cable Cutoff (nm) | 1405 | 1482 | 1340 | 1460 | 1285 | 1332 |
| MFD ($\mu$m) | 10.7 | 10.9 | 10.1 | 10.5 | 9.9 | 10.0 |
| Effective Area ($\mu$m$^2$) | 89.6 | 93.6 | 79.9 | 87.9 | 75.1 | 78.1 |
| Dispersion (ps/nm.km) | 18.9 | 19.5 | 18.6 | 20.0 | 19.0 | 19.2 |
| Slope (ps/nm$^2$.km) | 0.0591 | 0.0598 | 0.0570 | 0.0590 | 0.0649 | 0.0603 |
| Pin Array (dB) | 2.59 | 1.62 | 4.40 | 2.00 | 9.72 | 5.76 |
| Lateral Load (dB) | 0.24 | 0.28 | 0.14 | 0.19 | 0.14 | 0.16 |
| Group Index $n_g$ | 1.468105 | 1.468154 | 1.468287 | 1.468289 | 1.467999 | 1.468055 |
| Effective Index | 1.446534 | 1.446681 | 1.446339 | 1.446589 | 1.445905 | 1.446079 |
| Delta $n_g$ | 0.000049 | | 0.000002 | | 0.000056 | |
| Delta $n_{eff}$ | 0.000147 | | 0.000251 | | 0.000174 | |
| Group delay difference Delta $\tau$ (ps/km) | 0.16 | | 0.01 | | 0.19 | |
| Delta beta (1/m) | 595 | | 1016 | | 705 | |

The multicore optical fiber 10 may be manufactured using conventional fiber draw techniques, for example. This may include forming by drawing the inner glass region 12 from a preform in a draw furnace at a temperature of about 2,000° C. The drawn fiber is then cooled, coated with the one or more coating layers and wound onto a roll. It should be appreciated that the multicore optical fiber 10 may be manufactured using other techniques.

Accordingly, the multicore optical fiber 10 advantageously provides for multiple cores with different effective indices but with the same group index which results in reduced crosstalk and low or no skew.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

It will be apparent to those skilled in the art that various modifications and variations can be made without departing from the spirit or scope of the claims.

What is claimed is:

1. A multicore optical fiber comprising:
   a first core region having a first refractive index profile;
   a second core region having a second refractive index profile, wherein the first core region is separated from the second core region by a separation distance in a range of 20-50 μm;
   an outer cladding surrounding the first and second core regions, wherein the first core region exhibits a first effective index and a first group index and the second core region exhibits a second effective index and a second group index, wherein the first and second effective indices are different to suppress crosstalk and the first and second group indices are substantially the same to achieve a substantially similar group velocity, wherein the first and second core regions are single-moded, and wherein the first and second core regions have a group delay difference below 1 ps/km.

2. The multicore optical fiber of claim 1, wherein a difference between the first and second effective indices is greater than $1 \times 10^{-5}$ and a difference between the first and second group indices of the first and second core regions is less than $1 \times 10^{-3}$.

3. The multicore optical fiber of claim 1, wherein a difference between the first and second effective indices is greater than $5 \times 10^{-5}$ and a difference between the first and second group indices of the first and second core regions is less than $1 \times 10^{-4}$.

4. The multicore optical fiber of claim 1, wherein the first and second core regions each comprise a core having-a core radius in the range of 3-10 μm and a core $\Delta_1$(%) in the range of 0.2% to 0.5%.

5. The multicore optical fiber of claim 1, wherein the first and second core regions are designed to operate at a wavelength of approximately 1310 nm, and wherein the first and second core regions each comprises an effective area in the range of 50-80 μm².

6. The multicore optical fiber of claim 5, wherein the first and second core regions have dispersion in the range of −10 to +10 ps/(nm×km).

7. The multicore optical fiber of claim 1, wherein the first and second core regions are designed to operate at a wavelength of approximately 1550 nm, and wherein the first and second core regions each comprise an effective area in the range of 60-90 μm².

8. The multicore optical fiber of claim 7, wherein the first and second core regions each comprise a dispersion in the range of −10 to +25 ps/(nm×km).

9. The multicore optical fiber of claim 1, wherein the first core region comprises a first core and a first inner cladding surrounding the first core, and wherein the second core region comprises a second core and a second inner cladding surrounding the second core.

10. The multicore optical fiber of claim 9, wherein the first inner cladding comprises a first low index trench and the second inner cladding comprises a second low index trench, wherein a refractive index of the first low index trench is lower than a refractive index of the first cladding and a refractive index of the outer cladding, and wherein a refractive index of the second low index trench is lower than a refractive index of the second cladding and the refractive index of the outer cladding.

11. The multicore optical fiber of claim 1, further comprising an outer protection layer surrounding the outer cladding.

12. The multicore optical fiber of claim 1, wherein the separation distance between the first and second core regions is in the range of 25-45 μm.

13. The multicore optical fiber of claim 1, wherein the first and second core regions experience a crosstalk below −30 dB/km.

14. The multicore optical fiber of claim 1, wherein the first and second core regions experience a crosstalk below −50 dB/km.

15. The multicore optical fiber of claim 1, wherein the first and second core regions experience a group delay difference below 0.5 ps/km.

16. The multicore optical fiber of claim 1, further comprising more than two core regions surrounded by the outer cladding.

17. A multicore optical fiber comprising:

a first core region having a first refractive index profile and a first core having a first core size;

a second core region having a second refractive index profile and a second core having a second core size different from the first core size, wherein the first core region is separated from the second core region by a separation distance in a range of 20-50 μm; and an outer cladding surrounding the first and second core regions, wherein the first core region exhibits a first effective index and a first group index and the second core region exhibits a second effective index and a second group index, wherein the first and second effective indices are substantially different to suppress crosstalk and the first and second group indices are the same to achieve a substantially similar group velocity, wherein a difference between the first and second effective indices is greater than $1 \times 10^{-5}$ and a difference between the first and second group indices of the first and second core regions is less than $1 \times 10^{-3}$, wherein the first and second core regions are single-moded, and wherein the first and second core regions have a group delay difference below 1 ps/km.

18. The multicore optical fiber of claim 17, wherein a difference between the first and second effective indices is greater than $5 \times 10^{-5}$ and a difference between the first and second group indices of the first and second core regions is less than $1 \times 10^{-4}$.

* * * * *